(12) United States Patent  
Wen

(10) Patent No.: US 6,683,293 B1
(45) Date of Patent: Jan. 27, 2004

(54) TDI IMAGER WITH TARGET SYNCHRONIZATION

(75) Inventor: David D. Wen, Los Altos, CA (US)

(73) Assignee: Fairchild Imaging, Milpitas, CA (US)

( * ) Notice: Subject to any disclaimer, the term of this patent is extended or adjusted under 35 U.S.C. 154(b) by 62 days.

(21) Appl. No.: 10/133,225

(22) Filed: Apr. 26, 2002

(51) Int. Cl.[7] .............................................. H01L 27/00
(52) U.S. Cl. .................................. 250/208.1; 348/315
(58) Field of Search ........................ 250/208.1, 559.05, 250/559.06; 348/294, 295, 311, 315, 316

(56) References Cited

U.S. PATENT DOCUMENTS

| | | |
|---|---|---|
| 3,833,762 A | 9/1974 | Gudmundsen |
| 4,580,894 A | 4/1986 | Wojcik |
| 4,748,514 A | 5/1988 | Bell |
| 4,922,337 A | 5/1990 | Hunt et al. |
| 4,949,191 A | 8/1990 | Eisen |
| 4,952,809 A | 8/1990 | McEwen |
| 5,453,781 A | 9/1995 | Stein |
| 5,539,532 A | 7/1996 | Watanabe |
| 5,781,451 A | 7/1998 | Lofthus et al. |
| RE36,047 E | 1/1999 | Gilblom et al. |
| 6,297,491 B1 | 10/2001 | Mangerson |
| 6,459,077 B1 * | 10/2002 | Hynecek .................. 250/208.1 |
| 6,608,296 B1 * | 8/2003 | Toyoda et al. ........... 250/208.1 |

* cited by examiner

Primary Examiner—David Porta
Assistant Examiner—Patrick J. Lee
(74) Attorney, Agent, or Firm—Townsend and Townsend and Crew LLP

(57) ABSTRACT

Embodiments of the present invention are directed to an apparatus and a method for synchronizing the velocity of an image of a moving object or target and the clocking of image sensor elements used to track the moving target. In one embodiment, an imaging apparatus comprises a two-dimensional array of image sensor elements being configured to sense a first set of image elements of a target moving in a first direction with respect to the two-dimensional array of image sensor elements, to integrate light from the set of image elements into corresponding pixel values, and to shift the pixel values along the image sensor elements in the first direction according to a clock rate. A row of image sensor elements extends in the first direction to sense a second set of image elements of the target moving in the first direction. A synchronization module is coupled with the row of image sensor elements to measure the velocity of the target moving in the first direction based on a rate of movement of the second set of image elements of the target sensed by the row of image sensor elements, and to synchronize the clock rate of shifting the pixel values along the image sensor elements of the two-dimensional array with the velocity of the image elements of the target moving in the first direction.

20 Claims, 2 Drawing Sheets

TDI IMAGER WITH TARGET SYNCHRONIZATION

BACKGROUND OF THE INVENTION

The present invention relates to optical imaging and, more particularly, to an apparatus and a method for synchronizing the velocity of an image of a moving object or target and the clocking of image sensor elements used to track the moving target.

A widely used method of electro-optical single-frame imaging involves mechanically sweeping an image past a linear array of photoelements and reading out the array once for each incremental advance of the image. In this way, nearly square frames or long strip-type frames of imagery may be obtained. Certain types of arrays, such as time delay and integrate (TDI) arrays operate the same way, differing primarily in that they collect signals over many line periods.

An early example of utilizing scanned linear imaging arrays is a device having a series of back-to-back silicon diodes in a structure made from two monolithic silicon diode arrays. The array was electronically scanned with the aid of a fixed voltage drop along one of these arrays, together with a voltage sawtooth applied at one terminal. Other types of electronically scanned linear arrays followed, including the use of charge-coupled device (CCD) arrays. The scanning function can be performed in excellent fashion with a simple CCD shift register coupled to the array of photodiodes.

In TDI imaging, each photoelement of the line-scan array is replaced by a light sensing CCD shift register. The TDI imaging CCD arrays are commonly constructed out of a plurality of closely spaced, parallel TDI CCD shift registers built on a photoelectric semiconductor substrate. The array of sensor elements or detectors are used to store an electrical signal representative of the time-integrated radiation intensity. An optical image is scanned across the surface of the photoelectric semiconductor substrate of the TDI imager along the length of the TDI shift registers. The shift registers are clocked in synchronism with the motion of the optical image. Electrons that are freed under one of the TDI shift registers by the photoelectric effect of light in a given portion of the optical image are collected into a charge packet that will be moved along by the TDI shift register in conjunction with that given portion of the optical image. When a charge packet reaches the end of its associated TDI shift register, it is fed into an output CCD shift register in parallel with all of the other charge packets which have reached the end of the their associated TDI shift registers at the same time. The output shift register rapidly shifts out all of the charge packets fed thereto, and provides a series of charge packets or pixel values. The variable charge levels of the series of charge packets correspond to the variable light intensity of a picture line taken from the two-dimensional optical image scanned across the TDI imaging CCD array of the TDI imager.

For a TDI imaging CCD array to function properly without image smearing, the charge packets must be shifted down the shift registers at the same velocity as the image being scanned across the surface of the CCD array.

BRIEF SUMMARY OF THE INVENTION

Embodiments of the present invention are directed to an apparatus and a method for synchronizing the velocity of an image of a moving object or target and the clocking of image sensor elements used to track the moving target. The image of the moving target is projected onto an array of image sensor elements such as a TDI imaging CCD array. The image of the moving target moves in a first direction, and the array of image sensor elements integrate light from the image projected thereon into pixel values, which are shifted along the image sensor elements in the first direction according to a clock rate. The velocity of the image of the moving target is measured by providing a row of image sensors such as a linear CCD imager which extends in the first direction. A portion of the image of the moving target is projected onto the row of image sensors which sense the rate of movement of the portion of the image projected thereon to measure the velocity of the image. The velocity of the image and the clock rate are compared, and the result is used to adjust either the clock rate or the velocity of the target to synchronize the clock rate and the velocity of the image of the moving target.

In accordance with an aspect of the present invention, an imaging apparatus comprises a two-dimensional array of image sensor elements being configured to sense a first set of image elements of a target moving in a first direction with respect to the two-dimensional array of image sensor elements, to integrate light from the set of image elements into corresponding pixel values, and to shift the pixel values along the image sensor elements in the first direction according to a clock rate. A row of image sensor elements extends in the first direction to sense a second set of image elements of the target moving in the, first direction. A synchronization module is coupled with the row of image sensor elements to measure the velocity of the target moving in the first direction based on a rate of movement of the second set of image elements of the target sensed by the row of image sensor elements, and to synchronize the clock rate of shifting the pixel values along the image sensor elements of the two-dimensional array with the velocity of the image elements of the target moving in the first direction.

In some embodiments, the -two-dimensional array of image sensor elements comprises a CCD array, more desirably a TDI imaging CCD array. The row of image sensor elements comprises a linear CCD imager. The TDI imaging CCD array and the linear CCD imager may be formed on a substrate. The synchronization module may comprise a synchronization shift register configured to receive charges generated from the linear CCD imager, and a CCD correlation circuit coupled with the synchronization shift register and configured to correlate signals between different sets of taps positioned along the synchronization shift register to measure the velocity of the image elements of the target moving in the first direction. The CCD correlator generates an output which is directed to a clock timing generator for controlling the clock rate of shifting the pixel values along the image sensor elements of the TDI imaging CCD array to synchronize with the velocity of the image elements of the target moving in the first direction as measured by the CCD correlator. The CCD correlation circuit may be formed on the substrate with the TDI imaging CCD array and the linear CCD imager.

In specific embodiments, the synchronization module is configured to adjust either the velocity of the target moving in the first direction or the clock rate of shifting the pixel values along the image sensor elements of the two-dimensional array in the first direction to synchronize the velocity of the image elements of the target with the clock rate. The two-dimensional array of image sensor elements and the row of image sensor elements are disposed on a focal plane upon which the image elements of the target are projected. An output shift register is disposed to receive the pixel values shifted in the first direction from the two-dimensional array of image sensor elements.

In accordance with another aspect of the present invention, a method for optical imaging comprises projecting a first portion of an image of a target moving in a first direction onto a two-dimensional array of image sensor elements which are configured to integrate light from the image into corresponding pixel values, and shifting the pixel values along the image sensor elements in the first direction according to a clock rate. Each image sensor element of the two-dimensional array continues to integrate light projected thereon into the pixel value shifted therealong. A second portion of the image of the target moving in the first direction is projected onto a row of image sensor elements extending in the first direction. A velocity of the image of the target moving in the first direction is measured based on a rate of movement of the second portion of the image projected onto the row of image sensor elements and sensed by the row of image sensor elements. The method further comprises synchronizing the clock rate of shifting the pixel values along the image sensor elements of the two-dimensional array with the measured velocity of the image of the target moving in the first direction.

In accordance with another aspect of the invention, an imaging apparatus comprises a CCD array of image sensor elements being configured to generate charge packets from a first set of image elements of a target projected on the image sensor elements and moving in a first direction with respect to the CCD array of image sensor elements, and to shift the charge packets along the image sensor elements in the first direction according to a clock rate. A linear CCD imager of image sensor elements extend in the first direction to sense a second set of image elements of the target moving in the first direction. The apparatus further comprises means for measuring a velocity of the image elements of the target moving in the first direction based on a rate of movement of the second set of image elements of the target sensed by the row of image sensor elements. A controller is configured to control either the velocity of the target moving in the first direction or the clock rate of shifting the charge packets along the image sensor elements of the CCD array in the first direction to synchronize the velocity of the image of the target with the clock rate.

In some embodiments, the controller comprises a clock timing generator coupled between the measuring means and at least one clock driver, and being configured to generate a clock rate adjustment based on the measured velocity of the image of the target received from the measuring means and feed the clock rate adjustment to the at least one clock driver to adjust the clock rate of the at least one clock driver used to shift the charge packets along the image sensor elements of the CCD array in the first direction. In other embodiments, the controller comprises a target timing generator coupled between the measuring means and a target driver, and being configured to generate a target velocity adjustment based on the measured velocity of the image of the target received from the measuring means and the clock rate to adjust the velocity of the target moving in the first direction.

DETAILED DESCRIPTION OF THE INVENTION

Figure 1:
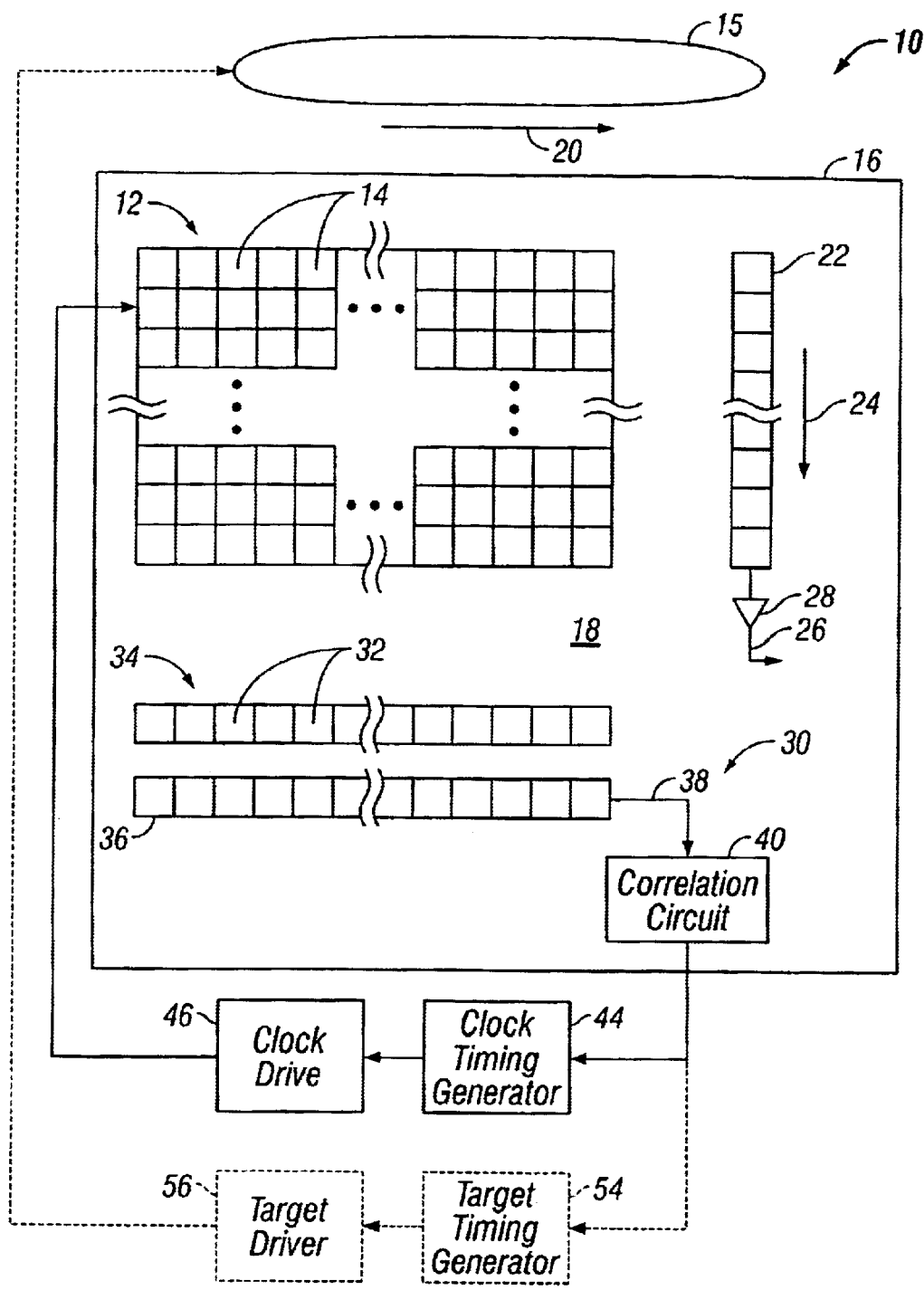
FIG. 1 is a simplified schematic diagram of an imaging apparatus according to an embodiment of the present invention.

FIG. 1 shows an imaging apparatus 10 which includes a two-dimensional array 12 of image sensor elements 14. The array 12 typically may have over a thousand sensor elements 14. Each sensor element 14 produces a charge packet or pixel value, the value of which indicates the intensity of the light in the portion of the image of a target 15 incident upon that element 14. The sensor elements 14 are CCD photosensitive cells, and preferably comprise a plurality of time delay and integrate (TDI) shift registers each composed of a plurality of such cells. In the specific embodiment shown, the array 12 is a time delay and integrate (TDI) imaging CCD array, and the imaging apparatus is referred to as a TDI imager 10. In other embodiments, the array 12 may include sensors that respond to the color or other characteristics of the image.

The array 12 is typically disposed on a substrate such as a semiconductor substrate 16. The array 12 is positioned in the focal plane 18 of an optical image which is focused onto the focal plane 18, for example, in a conventional manner by a lens (not shown), such as the lens of a camera, a scanner, or the like. The sensor elements 14 sense a first set of image elements of the optical image projected onto the imaging apparatus 10. The optical image of the target 15 moves with respect to the array 12 in a direction indicated by the arrow 20, and is scanned across the focal plane or surface 18 of the semiconductor substrate 16 of the imaging apparatus or TDI imager 10 along the length of the TDI shift registers contained in the TDI imaging CCD array 12. The TDI shift registers are clocked to shift the pixel values or charge packets along the TDI shift registers according to a clocking speed or clock rate, which is ideally in synchronism with the motion of the optical image. Electrons that are freed under one of the TDI shift registers by the photoelectric effect of light in a given portion of the optical image are collected into a charge packet that will be moved along by the TDI shift register in conjunction with that given portion of the optical image. The charge packets are moved according to the clock rate along the arrow 20 in what may be referred to as the TDI direction 20.

When a charge packet reaches the end of its associated TDI shift register, it is fed into an output CCD shift register 22 in parallel with all of the other charge packets which have reached the end of the their associated TDI shift registers at the same time. The output shift register 22 is disposed on the substrate 16. The output shift register 22 serially shifts out all of the charge packets fed thereto in the direction indicated by the arrow 24, and provides a series of charge packets or pixel values to an output line 26 which typically includes an amplifier 28. The variable charge levels of the series of charge packets correspond to the variable light intensity of a picture line taken from the two-dimensional optical image of the target 15 scanned across the TDI imaging CCD array 12.

To avoid image smearing in the TDI imager 10, a synchronization module 30 is provided to ensure that the charge packets are shifted down the TDI shift registers of the array 12 at the same velocity as the image of the target 15 being scanned across the surface of the TDI imaging CCD array 12. As shown in FIG. 1, the synchronization module 30 includes a row of image sensor elements 32 disposed on the focal plane 18 of the substrate 16 extending in the direction of the image movement indicated by the arrow 20 to sense a second set of image elements of the optical image of the target 15 projected onto the imaging apparatus 10. In the specific embodiment shown, a linear imager 34 having CCD sensor elements 32 is used. The linear imager 34 generates outputs which can be detected to measure the speed of the image of the target 15 being scanned across the focal plane 18 of the substrate 16. This can be done in any suitable manner. For example, the speed of the image can be determined by correlating the "edges" or any signals between different sets of taps positioned along a shift register which receives the charges from the sensor elements 32 of the linear imager 34. The speed of the image can be compared with the clock rate of shifting the pixel values along the TDI shift registers of the TDI imaging CCD array 12. Either the speed of the image or the clock rate of the sensors 14 in the array 12 can be adjusted to match the two and achieve synchronization between the speed of the image and the clock rate of the sensors 14. The speed of the image may be adjusted by controlling the driver for moving the target 15 using a target controller, while the clock rate of the sensors 14 may be adjusted by controlling the clock driver(s) for the sensors 14 using a clock controller.

As shown in FIG. 1, a second shift register or synchronization shift register 36 is provided to receive the charges generated by the sensor elements 32 of the linear imager 34. The pixel values or image elements sensed by the sensor elements 32 are serially shifted out onto an output line 38 and fed into a correlator or a correlation circuit 40. The correlation circuit 40 desirably is a CCD circuit which is also disposed on the substrate 16 of the imaging apparatus 10. The correlation circuit 40 correlates signals between different sets of taps positioned along a CCD register or delay tapped line. For instance, the correlation circuit 40 may monitor and track spikes in signals representing sharp transitions in the image (e.g., black-to-white and white-to-black transitions), as the image moves across the linear imager 34, to measure the speed of the image. In the embodiment shown, the output of the correlator circuit 40 is fed to a clock timing generator 44 which adjusts the clock rate of the sensors 14 to match the measured speed of the image. The adjusted clock rate is fed to the clock driver or set of clock drivers 46 for shifting the pixel values in the array 12. Alternatively, the output of the correlator circuit 40 is fed to a target timing generator 54 which adjusts the velocity of the target moving in the first direction based on the measured speed of the image of the target 15 to match the speed of the image with the clock rate. The adjusted velocity of the target 15 is fed to the target driver 56 for moving the target 15 in the first direction.

Figure 2:
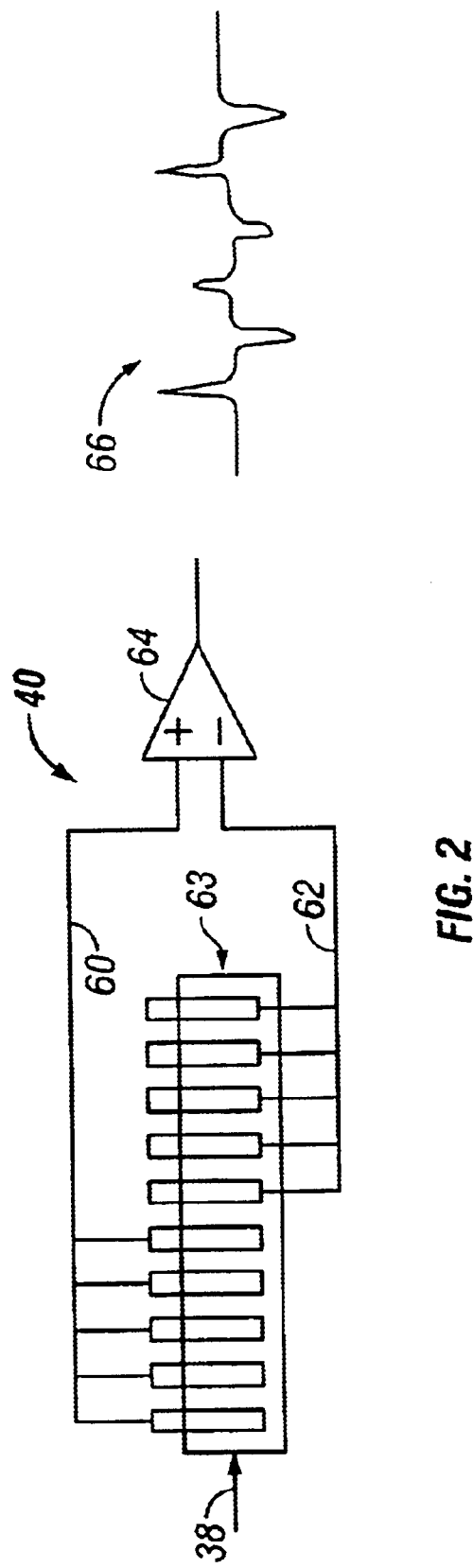
FIG. 2 is a simplified schematic diagram of a correlation circuit in the imaging apparatus of FIG. 1.

FIG. 2 shows a correlation circuit 40 which receives the output of the shift register 36 of FIG. 1. The pixel values or image elements sensed by the sensor elements of the shift register 36 are serially shifted out, amplified, and fed into the correlation circuit 40. The correlation circuit 40 desirably is a CCD circuit which is also disposed on the substrate 16 of the imaging apparatus 10. The correlation circuit 40 correlates signals between different sets of taps positioned along a shift register. For example, FIG. 2 shows a CCD register or delay tapped line 63 having two output lines 60, 62, which are connected to a differential amplifier 64 to generate a correlation signal 66.

In a specific embodiments, the TDI imaging CCD array 12, output shift register 22, linear imager 34, synchronization shift register 36, and correlation circuit 40 are all formed on a single semiconductor substrate 16.

The above-described arrangements of apparatus and methods are merely illustrative of applications of the principles of this invention and many other embodiments and modifications may be made without departing from the spirit and scope of the invention as defined in the claims. For instance, different ways of measuring the velocity of the image projected on the imaging apparatus 10 may be used, and different ways of synchronizing the velocity of the image and the clock rate may be employed based on the measurement result. The scope of the invention should, therefore, be determined not with reference to the above description, but instead should be determined with reference to the appended claims along with their full scope of equivalents.

What is claimed is:

1. An imaging apparatus comprising:

a two-dimensional array of image sensor elements being configured to sense a first set of image elements of a target moving in a first direction with respect to the two-dimensional array of image sensor elements, to integrate light from the set of image elements into corresponding pixel values, and to shift the pixel values along the image sensor elements in the first direction according to a clock rate;

a row of image sensor elements extending in the first direction to sense a second set of image elements of the target moving in the first direction; and a synchronization module coupled with the row of image sensor elements to measure the velocity of the target moving in the first direction based on a rate of movement of the second set of image elements of the target sensed by the row of image sensor elements, and to synchronize the clock rate of shifting the pixel values along the image sensor elements of the two-dimensional array with the velocity of the image elements of the target moving in the first direction.

2. The imaging apparatus of claim 1 wherein the two-dimensional array of image sensor elements comprises a CCD array.

3. The imaging apparatus of claim 1 wherein the two-dimensional array of image sensor elements comprises a TDI imaging CCD array.

4. The imaging apparatus of claim 3 wherein the row of image sensor elements comprises a linear CCD imager, the TDI imaging CCD array and the linear CCD imager being formed on a substrate.

5. The imaging apparatus of claim 4 wherein the synchronization module comprises:

a synchronization shift register configured to receive charges generated from the linear CCD imager; and a CCD correlation circuit coupled with the synchronization shift register and configured to correlate signals between different sets of taps positioned along the synchronization shift register to measure the velocity of the image elements of the target moving in the first direction.

6. The imaging apparatus of claim 5 wherein the CCD correlator generates an output which is directed to a clock timing generator for controlling the clock rate of shifting the pixel values along the image sensor elements of the TDI imaging CCD array to synchronize with the velocity of the image elements of the target moving in the first direction as measured by the CCD correlator.

7. The imaging apparatus of claim 5 wherein the CCD correlation circuit is formed on the substrate with the TDI imaging CCD array and the linear CCD imager.

8. The imaging apparatus of claim 1 wherein the synchronization module is configured to adjust either the velocity of the target moving in the first direction or the clock rate of shifting the pixel values along the image sensor elements of the two-dimensional array in the first direction to synchronize the velocity of the image elements of the target with the clock rate.

9. The imaging apparatus of claim 1 wherein the two-dimensional array of image sensor elements and the row of image sensor elements are disposed on a focal plane upon which the image elements of the target are projected.

10. The imaging apparatus of claim 1 further comprising an output shift register disposed to receive the pixel values shifted in the first direction from the two-dimensional array of image sensor elements.

11. A method for optical imaging, comprising:
projecting a first portion of an image of a target moving in a first direction onto a two-dimensional array of image sensor elements which are configured to integrate light from the image into corresponding pixel values;
shifting the pixel values along the image sensor elements in the first direction according to a clock rate, each image sensor element of the two-dimensional array continuing to integrate light projected thereon into the pixel value shifted therealong;
projecting a second portion of the image of the target moving in the first direction onto a row of image sensor elements extending in the first direction;
measuring a velocity of the image of the target moving in the first direction based on a rate of movement of the second portion of the image projected onto the row of image sensor elements and sensed by the row of image sensor elements; and
synchronizing the clock rate of shifting the pixel values along the image sensor elements of the two-dimensional array with the measured velocity of the image of the target moving in the first direction.

12. The method of claim 11 wherein the first portion and second portion of the image of the target moving in the first direction are projected onto a focal plane on which the two-dimensional array of image sensor elements and the row of image sensor elements are disposed.

13. The method of claim 11 wherein measuring the velocity of the image of the target comprises providing a synchronization shift register to receive charges generated from the row of image sensor elements; and correlating signals between different sets of taps positioned along the synchronization shift register to measure the velocity of the second portion of the image of the target projected onto the row of image sensor elements.

14. The method of claim 11 wherein synchronizing the clock rate with the measured velocity of the image of the target comprises adjusting either the velocity of the target moving in the first direction or the clock rate of shifting the pixel values along the image sensor elements of the two-dimensional array in the first direction.

15. The method of claim 11 wherein the two-dimensional array of image sensor elements comprises a TDI imaging CCD array.

16. The method of claim 11 wherein the row of image sensor elements comprises a linear CCD imager.

17. An imaging apparatus comprising:
a CCD array of image sensor elements being configured to generate charge packets from a first set of image elements of a target projected on the image sensor elements and moving in a first direction with respect to the CCD array of image sensor elements, and to shift the charge packets along the image sensor elements in the first direction according to a clock rate;
a linear CCD imager of image sensor elements extending in the first direction to sense a second set of image elements of the target moving in the first direction;
means for measuring a velocity of the image elements of the target moving in the first direction based on a rate of movement of the second set of image elements of the target sensed by the row of image sensor elements; and
a controller configured to control either the velocity of the target moving in the first direction or the clock rate of shifting the charge packets along the image sensor elements of the CCD array in the first direction to synchronize the velocity of the image of the target with the clock rate.

18. The imaging apparatus of claim 17 wherein the CCD array is a TDI imaging CCD array which is formed with the linear CCD imager on a substrate.

19. The imaging apparatus of claim 17 wherein the controller comprises a clock timing generator coupled between the measuring means and at least one clock driver, and being configured to generate a clock rate adjustment based on the measured velocity of the image of the target received from the measuring means and feed the clock rate adjustment to the at least one clock driver to adjust the clock rate of the at least one clock driver used to shift the charge packets along the image sensor elements of the CCD array in the first direction.

20. The imaging apparatus of claim 17 wherein the controller comprises a target timing generator coupled between the measuring means and a target driver, and being configured to generate a target velocity adjustment based on the measured velocity of the image of the target received from the measuring means and the clock rate to adjust the velocity of the target moving in the first direction.

* * * * *